United States Patent
Krishnamurthy et al.

(10) Patent No.: US 10,798,014 B1
(45) Date of Patent: Oct. 6, 2020

(54) EGRESS MAXIMUM TRANSMISSION UNIT (MTU) ENFORCEMENT

(71) Applicant: Arista Networks, Inc., Santa Clara, CA (US)

(72) Inventors: Prashanth Krishnamurthy, San Jose, CA (US); Simon Francis Capper, San Jose, CA (US); Tula Kraiser, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 10 days.

(21) Appl. No.: 16/377,150

(22) Filed: Apr. 5, 2019

(51) Int. Cl.
*H04L 12/28* (2006.01)
*H04L 12/805* (2013.01)

(52) U.S. Cl.
CPC .................... *H04L 47/36* (2013.01)

(58) Field of Classification Search
None
See application file for complete search history.

(56) References Cited

U.S. PATENT DOCUMENTS

| | | | | |
|---|---|---|---|---|
| 7,215,667 B1* | 5/2007 | Davis | ............... | H04L 12/4633 370/389 |
| 10,491,569 B1* | 11/2019 | Powell | ............... | H04L 61/2596 |
| 2007/0076623 A1* | 4/2007 | Aloni | ............... | H04L 47/2441 370/252 |
| 2008/0247395 A1* | 10/2008 | Hazard | ............... | H04L 45/00 370/392 |
| 2008/0247399 A1* | 10/2008 | Hazard | ............... | H04L 45/28 370/395.31 |
| 2009/0135833 A1* | 5/2009 | Lee | ............... | H04L 47/286 370/395.53 |
| 2009/0185549 A1* | 7/2009 | Shon | ............... | H04L 69/161 370/349 |
| 2014/0078915 A1* | 3/2014 | Edsall | ............... | H04L 47/30 370/252 |
| 2015/0146531 A1* | 5/2015 | Welin | ............... | H04L 45/74 370/235 |

* cited by examiner

*Primary Examiner* — Gerald A Smarth
(74) *Attorney, Agent, or Firm* — Chamberlain, Hrdlicka, White, Williams & Aughtry

(57) ABSTRACT

Certain embodiments disclosed herein relate to method for egress maximum transmission unit (MTU) enforcement. The method may include receiving a protocol packet at an ingress interface of a network device; make a first determination of a protocol packet payload length; performing an ingress MTU identifier lookup in an ingress MTU identifier table using the protocol packet payload length to obtain an ingress MTU identifier; performing a packet propagation lookup to obtain an egress MTU identifier; performing an MTU enforcement lookup in an MTU enforcement table using the ingress MTU identifier and the egress MTU identifier to obtain an egress action; and performing the egress action.

20 Claims, 9 Drawing Sheets

| Ingress MTU Identifier Table 400 ||
|---|---|
| MTU Range (bytes) | Ingress MTU identifier |
| 0-1500 | 1 |
| 1501-3000 | 2 |
| 3001-9214 | 3 |

FIG. 4

Packet Propagation Table 500

| Destination IP Address Prefix | Egress L3 Interface | Egress Interface MTU | Egress MTU Identifier |
|---|---|---|---|
| 10.10.0.0/16 | P1 | 1500 | 1 |
| 10.20.0.0/16 | P2 | 3000 | 2 |

FIG. 5

| MTU enforcement Table 600 | | |
|---|---|---|
| Ingress MTU Identifier | Egress MTU Identifier | Egress Action |
| 1 | 1 | Forward |
| 1 | 2 | Forward |
| 2 | 1 | Exception |
| 2 | 2 | Forward |
| 3 | 1 | Exception |
| 3 | 2 | Exception |

FIG. 6

| Updated Ingress MTU Identifier Table 700 | |
| --- | --- |
| MTU Range (bytes) | Ingress MTU identifier |
| 0-1500 | 1 |
| 1501-2100 | 2 |
| 2100-3000 | 3 |
| 3001-9214 | 4 |

FIG. 7

| Updated Packet Propagation Table 800 | | | |
|---|---|---|---|
| Destination IP Address Prefix | Egress Interface | Egress Interface MTU | Egress MTU Identifier |
| 10.10.0.0/16 | P1 | 1500 | 1 |
| 10.20.0.0/16 | P3 | 2100 | 2 |
| 10.30.0.0/16 | P2 | 3000 | 3 |

FIG. 8

| Updated MTU Enforcement Table 900 |||
|---|---|---|
| Ingress MTU Identifier | Egress MTU Identifier | MTU Enforcement Action |
| 1 | 1 | Forward |
| 1 | 2 | Forward |
| 1 | 3 | Forward |
| 2 | 1 | Exception |
| 2 | 2 | Forward |
| 2 | 3 | Forward |
| 3 | 1 | Exception |
| 3 | 2 | Exception |
| 3 | 3 | Forward |
| 4 | 1 | Exception |
| 4 | 2 | Exception |
| 4 | 3 | Exception |

FIG. 9

EGRESS MAXIMUM TRANSMISSION UNIT (MTU) ENFORCEMENT

BACKGROUND

Network devices often receive protocol packets (e.g., Internet Protocol (IP) packets) of varying payload lengths. Such network devices also often have egress interfaces for which a maximum transmission unit (MTU) size is configured. Problems may arise for network devices that lack a scheme to enforce the MTU size configuration for egress interfaces and attempt to transmit routed packets that exceed the MTU size of the egress interface.

SUMMARY

In general, in one aspect, embodiments disclosed herein relate to a method for egress maximum transmission unit (MTU) enforcement. In one or more embodiments, the method includes receiving a protocol packet at an ingress interface of a network device; make a first determination of a protocol packet payload length; performing an ingress MTU identifier lookup in an ingress MTU identifier table using the protocol packet payload length to obtain an ingress MTU identifier; performing a packet propagation lookup to obtain an egress MTU identifier; performing an MTU enforcement lookup in an MTU enforcement table using the ingress MTU identifier and the egress MTU identifier to obtain an egress action; and performing the egress action.

In general, in one aspect, embodiments disclosed herein relate to a non-transitory computer readable medium that includes instructions which, when executed by a processor, perform a method for egress maximum transmission unit (MTU) enforcement. In one or more embodiments, the method includes receiving a protocol packet at an ingress interface of a network device; make a first determination of a protocol packet payload length; performing an ingress MTU identifier lookup in an ingress MTU identifier table using the protocol packet payload length to obtain an ingress MTU identifier; performing a packet propagation lookup to obtain an egress MTU identifier; performing an MTU enforcement lookup in an MTU enforcement table using the ingress MTU identifier and the egress MTU identifier to obtain an egress action; and performing the egress action.

Other aspects of embodiments described herein will be apparent from the following description and the appended claims.

BRIEF DESCRIPTION OF DRAWINGS

FIGS. 4-9 show an example in accordance with one or more embodiments described herein.

DETAILED DESCRIPTION

Figure 1:
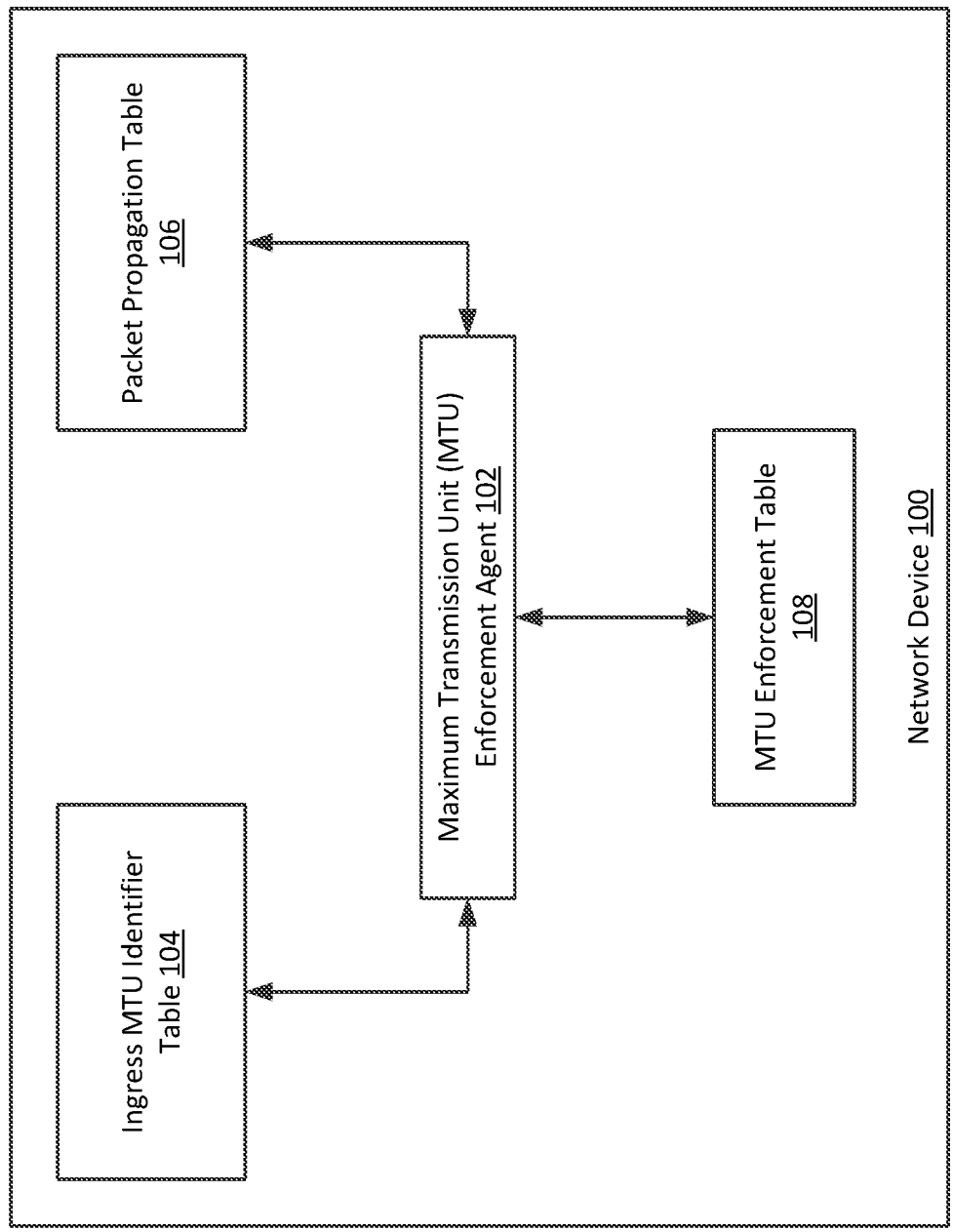
FIG. 1 shows a system in accordance with one or more embodiments described herein.

Specific embodiments will now be described with reference to the accompanying figures. In the following description, numerous details are set forth as examples of embodiments. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

In general, embodiments described herein relate to methods and systems for enforcing egress MTU size configurations. Specifically, in one or more embodiments, protocol payload length is assessed for incoming (i.e., ingress) protocol packets. The payload length may be used as a key to determine an ingress MTU identifier. In one or more embodiments, a routing lookup yields, directly or indirectly, an egress MTU identifier. In one or more embodiments, the ingress MTU identifier and the egress MTU identifier are used as keys to determine an egress action (e.g., forward, or don't forward and invoke an exception handler).

FIG. 1 shows a network device in accordance with one or more embodiments described herein. As shown in FIG. 1, the network device (100) includes a MTU enforcement agent (102), an ingress MTU identifier table (104), a packet propagation table (106), and a MTU enforcement table (108). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (which may also be referred to as a port). Examples of a network device (100) include, but are not limited to, a network switch, a router, a multilayer switch, a fibre channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of table lookups (e.g., LPM lookups, MTU enforcement-related lookups, etc.) and corresponding actions, which may be referred to as a pipeline. Examples of pipeline processing include performing a lookup to determine: (i) whether to take a security action (e.g., drop the network traffic data unit); (ii) whether to mirror the network traffic data unit; (iii) determine how to route the network traffic data unit in order to transmit the network traffic data unit, from a network interface of the network device (100); and/or (iv) whether a configured MTU for an egress interface is of sufficient size to allow the forwarding of the network traffic data unit.

In one or more embodiments, a network device also includes and/or is operatively connected to any device storage (not shown) and/or device memory (not shown) (i.e., non-transitory computer readable mediums) storing any software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments may be stored, in whole or in part, temporarily or permanently, on a non-transitory computer readable medium such as a CD, DVD, storage device, a diskette, a tape, flash memory, physical memory, or any other non-transitory computer readable medium.

Specifically, the software instructions may correspond to computer readable program code that when executed by a processor(s), is configured to perform functionality related to embodiments described herein.

In one or more embodiments, the network device (100) is part of a network (not shown). A network may be an entire network or any portion thereof (e.g., a logical portion of network devices within the network topology, external to the network topology, etc.). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, the network device (100) includes any number of hardware components (e.g., network chips, field programmable gate arrays (FPGAs), etc.) (not shown). In one or more embodiments, a hardware component is any hardware (e.g., circuitry such as, for example, application specific integrated circuits (ASICs)), which may include software and/or firmware, that includes functionality related to receiving, processing, and/or transmitting network traffic data units in accordance with one or more embodiments described herein.

In order to perform such functionality, a hardware component may include any number of sub-components (not shown). Such subcomponents may include, but are not limited to, one or more processors, one or more buffers (e.g., for implementing receive and/or transmit queues, such as virtual output queues (VOQs)), any type or amount of storage of any type for storing hardware tables (e.g., ingress MTU identifier table (104), packet propagation table (106), MTU enforcement table (108), etc.). Such tables may control, at least in part, various aspects of the operation of a network device (100), such as functionality related to network traffic data unit forwarding, egress MTU enforcement, etc. Examples of such storage for hardware table may include, but are not limited to, tertiary content addressable memory (TCAM) and static random access memory (SRAM). A hardware component may also include and/or be operatively connected to any number of physical network interfaces of a network device (100). Such interfaces may provide a path external to the network device (e.g., to other devices), and/or may be operatively connected to other components internal to the network device (104), and each such interface may be an ingress and/or egress interface.

As a non-limiting example, a hardware component may be and/or include an ASIC that receives network traffic data units at an ingress port, and, so long as no security policy or MTU enforcement policy indicates the network traffic data units should be dropped, determines out of which egress port on the network device (100) to forward the network traffic data units such as, for example, media access control (MAC) frames that include Internet Protocol (IP) packets.

In one or more embodiments, a network device (100) may include any number of protocol layer logical interfaces (not shown) associated with a given physical interface. For example, a given physical interface may be associated with a layer 2 (L2) interface (e.g., Ethernet) and a layer 3 (L3) interface. In a network device with such interfaces, an incoming network traffic data unit may first be processed by the L2 (i.e., lower layer) interface before being passed to the L3 (i.e., higher layer) interface during processing of a network traffic data unit. The reverse may happen for outgoing network traffic data units.

In one or more embodiments, any or all protocol layer logical interfaces are configured with a MTU size. In one or more embodiments, a MTU size is a maximum size of a network traffic data unit that may be transmitted from the interface for which the MTU size is configured. In one or more embodiments, a higher layer interface's configured MTU is based, at least in part, on that of a lower layer MTU size configuration. For example, if an L2 egress interface is configured with a MTU size of 1500 for Ethernet frames to be transmitted, a corresponding L3 interface for the egress interface may be set at or below 1500 in order to help ensure that a network device (100) does not attempt to transmit network traffic data units that exceed a configured MTU size.

In one or more embodiments, received network traffic data units include any number of headers appended to a payload that was generated at an application layer (not shown). For example, an Ethernet frame may have a data payload within a transmission layer header within an IP header within an Ethernet header. In such a scenario, when a network traffic data unit is received at a network device or computing device, logical interfaces may process the network traffic data unit using the header corresponding to the particular layer for which the logical interface was configured. Continuing the example, an L3 interface may process the network traffic data unit based on information within the IP header.

In one or more embodiments, a portion of a network traffic data unit may be referred to as a protocol packet. For example, an Ethernet frame may include an IP packet, which includes the IP header, a layer 4 (L4) header, and a data payload. In such an example, the IP packet portion of the network traffic data unit may be referred to as a protocol packet. In one or more embodiments, the length (e.g., in bytes) of a protocol packet is referred to as a protocol packet payload length.

In one or more embodiments, the header of a protocol packet includes a variety of fields that convey various items of information to devices receiving the protocol packet. Such fields may be represented, for example, as binary numbers. In one or more embodiments, one such field is the protocol packet payload length. For example, an IP header may include IP version information, IP header length, IP packet payload length (which includes the IP header, all higher layer protocol headers, and the data payload of the packet), source address (i.e., an IP address identifying the source device of the IP packet), destination address, time-to-live, various flags, information relating to fragmentation, etc.

One having ordinary skill in the art, and the benefit of this Detailed Description, will appreciate that although IP is often discussed herein with relevant details being derived from version 4 of the protocol (IPv4), other versions (e.g., IPv6), or other protocols (e.g., a tunneling protocol such as VXLAN) may be used without departing from the scope of the invention. In one or more embodiments, using a different protocol version and/or a different protocol may alter certain details of the invention, such as header fields having different names and/or content, or certain header fields existing in one protocol/protocol-version, but not in another.

In one or more embodiments (e.g., embodiments using IPv4), a protocol packet payload length may be represented directly in a header field. In one or more embodiments (e.g., embodiments using IPv6), protocol packet payload length may be a value derived using a header field value an performing an additional action. For example, the payload length in IPv6 header does not account for the IPv6 header itself, whereas the total-length in IPv4 header includes the length of IP header as well. Accordingly, IPv6 payload length may have a known amount of length (e.g., the IPv6 header length) added to the payload length in the header field, with the result being used as the protocol packet payload length for embodiments described herein.

In one or more embodiments, a network device (100) includes a MTU enforcement agent (102). In one or more embodiments, a MTU enforcement agent (102) is hardware (e.g., circuitry) and/or combination of hardware and software that includes functionality including, but not limited to, programming various tables relating to MTU enforcement based, at least in part, on configured MTU sizes of egress interfaces, and processing ingress protocol packets, at least in part by accessing and using the contents of such tables. For example, the MTU enforcement agent may be software running within an operating system environment and executing using, at least, integrated circuitry of a processor (not shown) of the network device (100). Functionality of the MTU enforcement agent (102) in various embodiments is discussed further in the descriptions of FIGS. 2-9, below.

In one or more embodiments, the MTU enforcement agent (102) is operatively connected to an ingress MTU identifier table (104). In one or more embodiments, the ingress MTU identifier table (104) is a set of information in any format that associates an ingress MTU identifier with a range of protocol packet payload lengths. For example, a first range (e.g., 1 byte to 2000 bytes) may be associated with a first ingress MTU identifier (e.g., 1), and a second range (e.g., 2001 bytes to 5000 bytes) may be associated with a second ingress MTU identifier (e.g., 2). In one or more embodiments, an ingress MTU identifier table (104) may be used by a MTU enforcement agent (102) to perform an ingress MTU identifier lookup to obtain an ingress MTU identifier using a protocol packet payload length of a received protocol packet as a key.

One having ordinary skill in the art, and the benefit of this Detailed Description, will appreciate that an MTU identifier may be any item of information, may or may not be in an order that tracks the ranges in the ingress MTU identifier table, and may or may not be in an order that relates in any way to any information related to an egress interface (e.g., configured egress MTU sizes). In one or more embodiments, an MTU identifier is any item of information that can differentiate one ingress MTU range from another ingress MTU range by being a different item of information, and/or to uniquely identify configured egress MTU sizes for a device, or any portion thereof.

In one or more embodiments, the ingress MTU identifier table (104) is a hardware table stored in a sub-component of a hardware component of the network device (100), and is programmed there by the MTU enforcement agent (102). One having ordinary skill in the art, and the benefit of this Detailed Description, will appreciate that the ingress MTU identifier table (104) may alternately be stored in any volatile or non-volatile storage included in or operatively connected to the network device (100) that is accessible by the MTU enforcement agent (102).

In one or more embodiments, the MTU enforcement agent (102) is operatively connected to a packet propagation table (106). In one or more embodiments, the packet propagation table (106) is a set of information in any format that may be used in connection with identifying an egress interface for a received protocol packet, and may include additional information, such as egress MTU identifiers associated with egress interfaces.

For example, the packet propagation table (106) may be a routing and/or tunneling table that includes any number of entries, each of which includes, at least, a network prefix and a corresponding egress interface. Such a table may be used to perform a longest prefix match (LPM). In one or more embodiments, a LPM lookup includes looking within a set of prefixes to determine the longest prefix that matches an initial portion of an IP address (e.g., source IP address, destination IP address, etc.) of a protocol packet. For example, if a set of prefixes includes 10.10.0.0/16 and 10.0.0.0/8, and a network traffic data unit is received that includes a destination IP address of 10.10.35.68, 10.10.0.0/16 is the longest prefix match, because the first 16 bits match instead on only the first 8 bits. Accordingly, an LPM lookup in a table with such prefixes would return, at least, an egress interface associated with 10.10.0.0/16 rather than 10.0.0.0/8.

In one or more embodiments, performing a packet propagation lookup yields an egress interface. For example, the packet propagation lookup may yield an egress L3 interface, which may be used to determine an egress MTU identifier associated with the egress L3 interface. In other embodiments, a packet propagation table (106) includes an egress MTU identifier along with an egress interface. In such embodiments, a packet propagation lookup by a MTU enforcement agent (102) may directly yield an egress MTU identifier.

In one or more embodiments, the packet propagation table (106) is a hardware table stored in a sub-component of a hardware component of the network device (100), and is programmed to the hardware table, at least in part (e.g., the egress MTU identifier portion) by the MTU enforcement agent (102). One having ordinary skill in the art, and the benefit of this Detailed Description, will appreciate that the packet propagation table (106) may alternately be stored in any volatile or non-volatile storage included in or operatively connected to the network device (100) that is accessible by the MTU enforcement agent (102).

In one or more embodiments, the MTU enforcement agent (102) is operatively connected to MTU enforcement table (108). In one or more embodiments, the MTU enforcement table (108) is a set of information in any format that includes entries associating an ingress MTU identifier and egress MTU identifier (i.e., an ingress/egress identifier pair) with an egress action. For example, a MTU enforcement table may have a first entry with an ingress MTU identifier of 1 and an egress identifier of 2 associated with the egress action of allowing forwarding of a protocol packet, and a second entry with an ingress MTU identifier of 2 an egress identifier of 1 associated with the egress action of invoking an exception handler.

In one or more embodiments, the MTU enforcement table (108) is a hardware table stored in a sub-component of a hardware component of the network device (100), and is programmed to the hardware table by the MTU enforcement agent (102). One having ordinary skill in the art, and the benefit of this Detailed Description, will appreciate that the MTU enforcement table (108) may alternately be stored in any volatile or non-volatile storage included in or operatively connected to the network device (100) that is accessible by the MTU enforcement agent (102).

While FIG. 1 shows a configuration of components, other configurations may be used without departing from the scope embodiments described herein. For example, there may be any number of each of the three table types shown, in addition to any number of other tables. As another example, there may be any number of MTU enforcement agents. As another example, there may be any number of hardware components, software instances, etc. that are not shown in FIG. 1. Accordingly, embodiments disclosed herein should not be limited to the configuration of components shown in FIG. 1.

Figure 2:
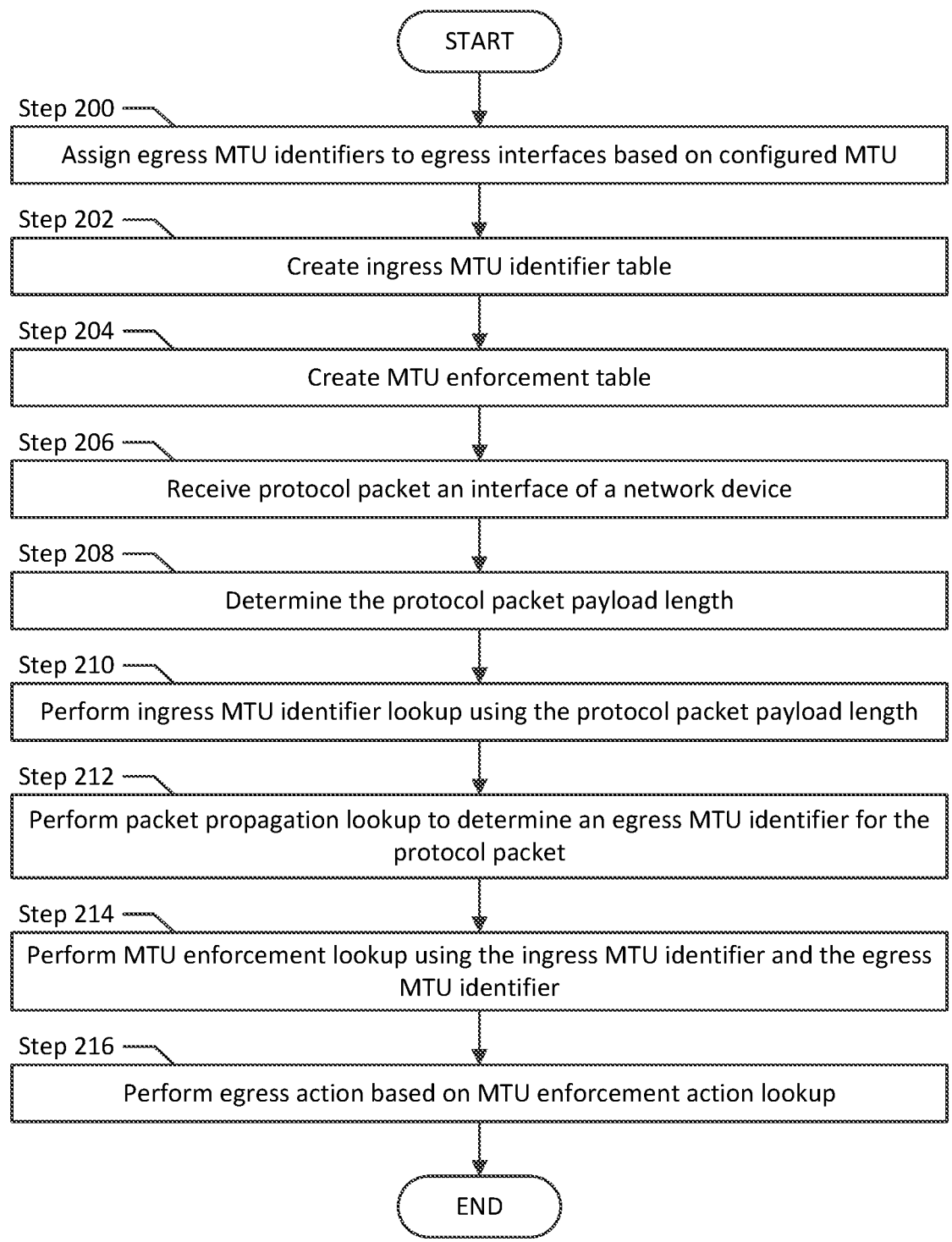
FIG. 2 shows a flowchart in accordance with one or more embodiments described herein.

FIG. 2 shows a flowchart describing a method for egress MTU enforcement in accordance with one or more embodiments disclosed herein.

While the various steps in this flowchart are presented and described sequentially, one of ordinary skill in the relevant art will appreciate that some or all of the steps may be executed in different orders, may be combined or omitted, and some or all of the steps may be executed in parallel.

In Step 200, egress MTU identifiers are assigned to egress interfaces. In one or more embodiments, a MTU enforcement agent assigns the egress MTU identifiers based on egress interface MTU sizes configured for the interfaces. In one or more embodiments, each egress interface having a common MTU size configured is assigned the same egress MTU identifier. In one or more embodiments, each different egress interface MTU size for egress interfaces of a network device is assigned a different egress MTU identifier. In one or more embodiments, each assigned egress MTU identifier is stored in a packet propagation table along with the identity of a corresponding egress interface. In other embodiments, each assigned egress MTU identifier is stored in a separate table associated with a corresponding egress interface that may be used as a key by a MTU enforcement agent to obtain an egress MTU identifier.

In Step 202, an ingress MTU identifier table is created. In one or more embodiments, an ingress MTU identifier table is created by a MTU enforcement agent by determining protocol packet payload length ranges based on egress MTU sizes configured for egress interfaces of a network device. For example, if a network device has two egress interfaces, and one has a configured MTU size of 1000 bytes, and the other has a configured MTU size of 2000, then three ranges would be created, 0-1000, and 1001-2000, and 2001 to a maximum MTU size. In one or more embodiments, each range is assigned an ingress MTU identifier corresponding to the egress MTU identifier associated with an egress interface configured with an egress MTU size that defines the top end of a given range. Continuing the previous example, 0-1000 would be associated with 1, which is the egress MTU identifier associated with an egress interface configured with an egress MTU size of 1000. In one or more embodiments, the range from the highest configured MTU to the maximum possible MTU is associated with an ingress MTU identifier that is higher than all other ingress MTU identifiers or egress MTU identifiers. In one or more embodiments, the ingress MTU identifier table is then programmed to storage such as, for example, a hardware table.

In Step 204, a MTU enforcement table is created. In one or more embodiments, the MTU enforcement table is created by a MTU enforcement agent using the various ingress MTU identifiers and egress MTU identifiers to compute (or re-compute) valid ingress/egress identifier pairs for which forwarding may be allowed, and invalid pairs for which an exception handler should be invoked. In one or more embodiments, a valid pair is one that indicates that the higher end of the range in the ingress MTU identifier table in which the protocol packet payload length of a received protocol packet falls is the same or less than the configured egress MTU size of an egress interface identified during a packet propagation lookup. In one or more embodiments, the MTU enforcement table is then programmed to storage such as, for example, a hardware table. In one or more embodiments, MTU enforcement table is programmed such that it is possible to override or bypass MTU enforcement based on one or more configuration policies.

In Step 206, a protocol packet is received at an interface of a network device. In one or more embodiments, a network traffic data unit is received as a stream of binary numbers transmitted over a transmission medium. The binary numbers may then be passed to a L2 protocol (e.g., Ethernet) that is invoked to perform certain actions on the network traffic data unit. Next, a protocol packet within the network is passed to an L3 protocol (e.g., IP) that is invoked to perform certain L3 protocol actions.

In Step 208, the protocol packet payload length is determined. In one or more embodiments, the protocol packet payload length is determined by a MTU enforcement agent. In one or more embodiments, the protocol packet payload length is determined by examining a field in the L3 header of the protocol packet. For example, IPv4 packets include a 'total length field', which is the length of the IP packet, including the IP header and all headers and data payloads within the IP packet combined. Other methods of determining the protocol packet length may be used without departing from the scope of embodiments disclosed herein. One example of such other methods include determining the stated IPv6 payload length, and adding to it the length of the IPv6 header to obtain the total protocol packet payload length. In one or more embodiments, a protocol packet payload length determination may include examining one or more fields of an inner network traffic data unit encapsulated by outer network traffic data unit headers. For example, if a tunneling scheme is being used (e.g., VXLAN), a field of the L3 header of the inner packet may be used to determine the protocol packet payload length rather than the outer L3 header.

In Step 210, an ingress MTU identifier lookup is performed using the protocol packet payload length obtained in Step 208. In one or more embodiments, the ingress MTU identifier lookup is performed by the MTU enforcement agent. In one or more embodiments, the protocol packet payload length is used as a key to find a range in the ingress MTU identifier table within which the length falls. For example, a protocol packet payload length of 1250 bytes may be used as a key to identify a range 0-2000 in the ingress MTU identifier table. In one or more embodiments, once the range is identified, the ingress MTU identifier associated with the range is obtained.

In Step 212, a packet propagation lookup is performed to obtain an egress MTU identifier. In one or more embodiments, the packet propagation lookup is performed by the MTU enforcement agent. In one or more embodiments, a destination address in the header of the protocol packet is used to obtain an egress interface. In one or more embodiments, the same table that yields the egress interface also yields the egress MTU identifier. In other embodiments, the identified egress interface is used to perform an additional lookup in a table associating egress interfaces with egress MTU identifiers. In one or more embodiments, additional lookups may be necessary. For example, an additional lookup may determine that the protocol packet is to be sent to a tunneling interface, which may cause additional protocol packet payload length to be added, which may change the egress MTU identifier used.

In Step 214, a MTU enforcement lookup is performed to obtain an egress action. In one or more embodiments, the MTU enforcement lookup is performed by the MTU enforcement agent. In one or more embodiments, the ingress MTU identifier obtained in Step 210 and the egress MTU identifier obtained in Step 212 as keys in order to obtain an associated egress action from a MTU enforcement table. In one or more embodiments, the lookup includes any number of additional keys that may be used to identify policy exceptions.

In Step 216, the egress action obtained in Step 214 is performed. In one or more embodiments, the egress action is either to allow forwarding of a protocol packet based on a valid ingress/egress identifier pair, or to invoke an exception handler based on an invalid ingress/egress identifier pair. In one or more embodiments, an invalid pair is one that indicates the protocol packet payload length is larger than the configured MTU size for the identified egress interface. In one or more embodiments, the exception handler will either fragment the protocol packet into fragments each small enough to be transmitted within the MTU size configured for the egress interface, or return an error message to the source device identified by a source address of the protocol packet. The error message will, at least, inform the source device that the protocol packet is too large to be sent by the network device. The error message may also include additional information, such as the configured MTU size of the relevant egress interface, a request to allow fragmenting of the packet by the network device, a request for the source device to fragment the protocol packet, etc.

Figure 3:
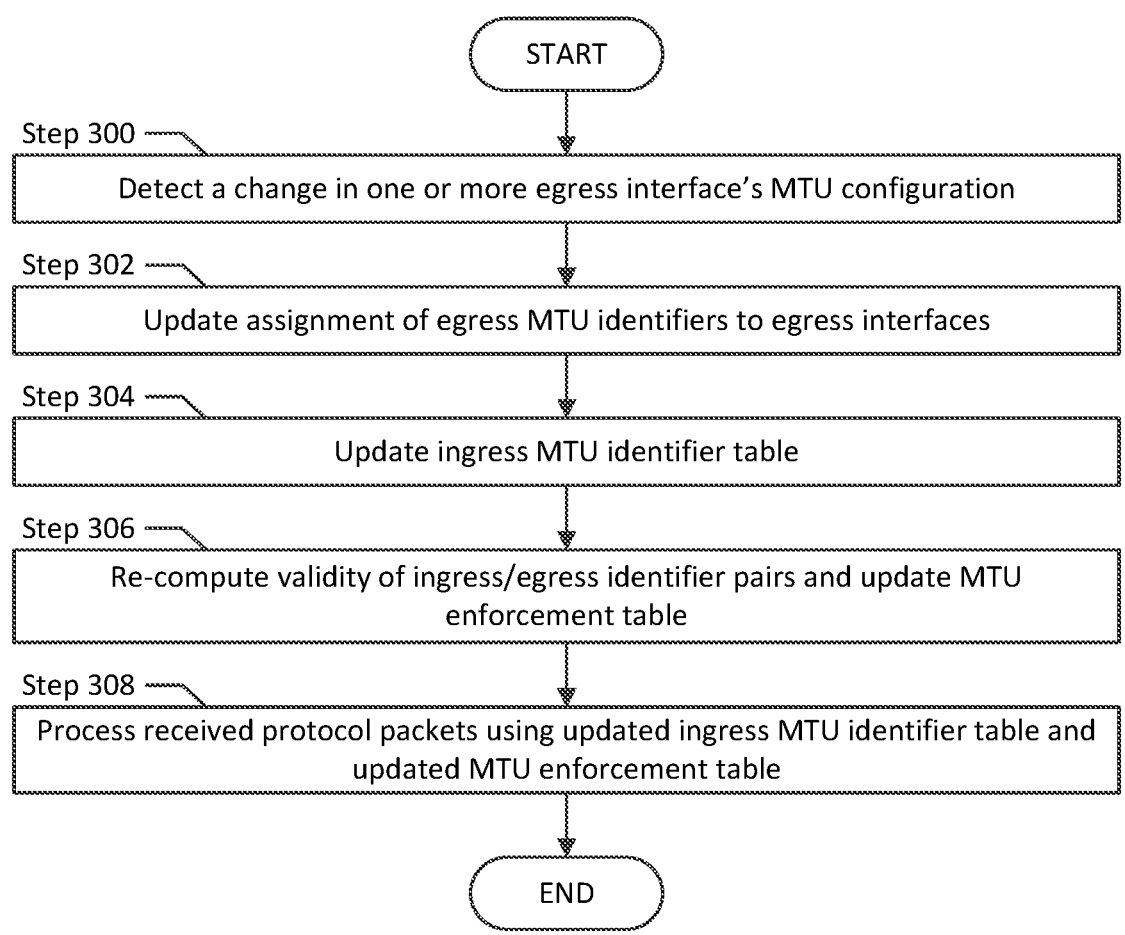
FIG. 3 shows a flowchart in accordance with one or more embodiments described herein.

FIG. 3 shows a flowchart describing a method for updating egress MTU enforcement-related tables based on a change in the set of configured MTU sizes for the egress interfaces of a network device in accordance with one or more embodiments disclosed herein.

While the various steps in this flowchart are presented and described sequentially, one of ordinary skill in the relevant art will appreciate that some or all of the steps may be executed in different orders, may be combined or omitted, and some or all of the steps may be executed in parallel.

In Step 300, a change is detected in the configuration of MTU size of one or more egress interfaces of a network device. In one or more embodiments, the detection of a configuration change is performed by the MTU enforcement agent. In one or more embodiments, the change is a change to a configured MTU size for an egress interface that previously had a different configured MTU size. In one or more embodiments, the change is the addition of an egress interface for which a MTU size is configured that is different from other MTU sizes configured for egress interfaces of a network device. In one or more embodiments, the change is the removal of an egress interface for which an egress MTU was configured that is not the same as other configured MTU sizes configured for other egress interfaces.

In Step 302, the egress MTU identifiers assigned to egress interfaces are updated. In one or more embodiments, the update is performed by the MTU enforcement agent. In one or more embodiments, the update is performed using a procedure substantially similar to the assignment of egress MTU identifiers discussed above in the description of Step 200 of FIG. 2.

In Step 304, the ingress MTU identifier table is updated. In one or more embodiments, the update is performed by the MTU enforcement agent. In one or more embodiments, the update is performed using a procedure substantially similar to the creation of the ingress MTU identifier table discussed above in the description of Step 202 of FIG. 2.

In Step 306, the validity if ingress/egress identifier pairs is re-computed, and the results of the re-computation are used to update the MTU enforcement table. In one or more embodiments, the re-computation and update are performed using a procedure substantially similar to the creation of the MTU enforcement table discussed above in the description of Step 204 of FIG. 2.

In Step 308, received protocol packets are processed using the updated ingress MTU identifier table and the updated MTU enforcement table. In one or more embodiments, received protocol packets are processed, at least in part, using a procedure substantially similar to the creation of the MTU enforcement table discussed above in the description of Steps 206-214 of FIG. 2.

FIGS. 4-9 show an example in accordance with one or more embodiments described herein. The following example is for explanatory purposes only and not intended to limit the scope of embodiments described herein.

FIG. 4 shows an ingress MTU identifier table (400) in accordance with embodiments of the invention described herein. FIG. 5 shows a packet propagation table (500) in accordance with embodiments of the invention described herein. FIG. 6 shows a MTU enforcement table (600) in accordance with embodiments of the invention described herein. FIG. 7 shows an updated ingress MTU identifier table (700) in accordance with embodiments of the invention described herein. FIG. 8 shows an updated packet propagation table (800) in accordance with embodiments of the invention described herein. FIG. 9 shows an updated MTU enforcement table (900) in accordance with embodiments of the invention described herein.

Referring to FIGS. 4-9, consider a scenario in which a network device has two egress L3 interfaces. A first egress L3 interface, labeled P1, is configured with a MTU size of 1500 bytes, and a second egress L3 interface, labeled P2, is configured with a MTU size of 3000 bytes, as well as an ingress interface for receiving Ethernet frames that include IP packets.

A MTU enforcement agent assigns a egress MTU identifier of 1 to the first egress L3 interface P1 and an egress MTU identifier of 2 to the second egress L3 interface P2. The egress MTU identifiers are stored in a packet propagation table that includes entries in which a network prefix is associated with egress L3 interface and an egress MTU identifier. The results of the assignment of egress MTU identifiers is shown in the packet propagation table (500) of FIG. 5. The packet propagation table (500) is programmed into a hardware table of a network chip.

Next, the MTU enforcement agent calculates ranges for the ingress MTU identifier table. Because the configured MTU sizes of the egress L3 interfaces are 1500 and 3000 bytes, the ranges are 0-1500, and 1501-3000. Additionally, a third range is created for protocol packet payload lengths above the highest configured egress L3 interface MTU size. The third range is 3001-9214 because 9214 is the largest protocol packet payload length that might be received by the network device in this example. The range 0-1500 is assigned an ingress MTU identifier of 1. The range 1501-3000 is assigned a ingress MTU identifier of 2. The range 3001-9214 is assigned a ingress MTU identifier of 3. The results of the calculation of ranges and assignment of ingress MTU identifiers is shown in the ingress MTU identifier table (400) shown in FIG. 4. The ingress MTU identifier table (400) is stored in a hardware table of an FPGA of the network device.

Next, a MTU enforcement table (600) is generated with an entry for each possible ingress/egress identifier pair. For each such pair, the MTU enforcement agent computes whether the pair is valid, meaning forwarding of a protocol packet should be allowed, or invalid, meaning an exception handler must be invoked. As discussed above, a valid pair is one that indicates that a received protocol packet has a payload length that is the same or smaller than the configured MTU size of an egress L3 interface identified during a packet propagation lookup.

In this example, an ingress MTU identifier of 1 indicates that the received protocol packet has a payload length within a range of 0-1500, and an egress MTU identifier of 1 indicates that the identified egress L3 interface has a configured MTU size of 1500 bytes. Thus the ingress/egress identifier pair of 1 and 1 is a valid pair, and the appropriate egress action is to allow forwarding of the protocol packet. Therefore, the first entry of the MTU enforcement table (600) includes the ingress MTU identifier 1, the egress MTU identifier 1, and the egress action 'Forward'.

In this example, an egress MTU identifier of 2 indicates that the identified egress L3 interface has a configured MTU size of 3000 bytes. Thus the ingress/egress identifier pair of 1 and 2 is a valid pair, and the appropriate egress action is to allow forwarding of the protocol packet. Therefore, the second entry of the MTU enforcement table (600) includes the ingress MTU identifier 1, the egress MTU identifier 2, and the egress action 'Forward'.

In this example, an ingress MTU identifier of 2 indicates that the received protocol packet has a payload length within a range of 1501-3000, and an egress MTU identifier of 1 indicates that the identified egress L3 interface has a configured MTU size of 1500 bytes. Thus the ingress/egress identifier pair of 2 and 1 is an invalid pair, and the appropriate egress action is to invoke an exception handler. Therefore, the third entry of the MTU enforcement table (600) includes the ingress MTU identifier 2, the egress MTU identifier 1, and the egress action 'Exception'.

In this example, an egress MTU identifier of 2 indicates that the identified egress L3 interface has a configured MTU size of 3000 bytes. Thus the ingress/egress identifier pair of 2 and 2 is a valid pair, and the appropriate egress action is to allow forwarding of the protocol packet. Therefore, the fourth entry of the MTU enforcement table (600) includes the ingress MTU identifier 2, the egress MTU identifier 2, and the egress action 'Forward'.

In this example, an ingress MTU identifier of 3 indicates that the received protocol packet has a payload length within a range of 3001-9214, and an egress MTU identifier of 1 indicates that the identified egress L3 interface has a configured MTU size of 1500 bytes. Thus the ingress/egress identifier pair of 3 and 1 is an invalid pair, and the appropriate egress action is to invoke an exception handler. Therefore, the fifth entry of the MTU enforcement table (600) includes the ingress MTU identifier 3, the egress MTU identifier 1, and the egress action 'Exception'.

In this example, an egress MTU identifier of 2 indicates that the identified egress L3 interface has a configured MTU size of 3000 bytes. Thus the ingress/egress identifier pair of 3 and 2 is a valid pair, and the appropriate egress action is to invoke an exception handler. Therefore, the sixth entry of the MTU enforcement table (600) includes the ingress MTU identifier 3, the egress MTU identifier 2, and the egress action 'Exception'.

The MTU enforcement table (600) is stored in a hardware table of an FPGA of the network device.

Continuing the example, once the ingress MTU identifier table (400), the packet propagation table (500), and the MTU enforcement table (600) are programmed into their respective hardware tables, they may be used for the egress L3 MTU enforcement aspect of processing received protocol packets.

Once an Ethernet frame is received at a physical interface of the network device, and has been processed to obtain the IP packet therein, the MTU enforcement agent checks the total length field of the IP header to ascertain that the protocol packet payload length is 1000 bytes. The length (or adjusted length if IPv6 is being used) is then used as a key to perform an ingress MTU identifier lookup in the ingress MTU identifier table (400), which yields an ingress MTU identifier of 1. Next, a packet propagation table lookup is performed using the packet propagation table (500) and the destination IP address found in the header of the IP packet, which is 10.10.27.75. Accordingly, the LPM identified is 10.10.0.0/16, which is associated with an egress L3 interface P1 that has an egress L3 interface MTU of 1500, which is associated with an egress MTU identifier of 1. Therefore, the ingress/egress identifier pair is 1 and 1. This pair is used to perform an MTU enforcement lookup in the MTU enforcement table (600), which yields an egress action of 'Forward'. Accordingly, the packet is further processed to forward the IP packet to an appropriate next-hop.

Next, another Ethernet frame is received at a physical interface of the network device, and has been processed to obtain the IP packet therein, the MTU enforcement agent checks the total length field of the IP header to ascertain that the protocol packet payload length is 5000 bytes. The length is then used as a key to perform an ingress MTU identifier lookup in the ingress MTU identifier table (400), which yields an ingress MTU identifier of 3. Next, a packet propagation table lookup is performed using the packet propagation table (500) and the destination IP address found in the header of the IP packet, which is 10.20.72.57. Accordingly, the LPM identified is 10.20.0.0/16, which is associated with an egress L3 interface P2 that has an egress L3 interface MTU of 3000, which is associated with an egress MTU identifier of 2. Therefore, the ingress/egress identifier pair is 3 and 2. This pair is used to perform an MTU enforcement lookup in the MTU enforcement table (600), which yields an egress action of 'Exception'. In this example, the packet is dropped, and an error message is returned to a source device identified by a source IP address of the IP packet. Alternatively, the packet could be fragmented to appropriate size portions and then the portions are forwarded.

Continuing the example, consider a scenario in which a network device has an egress L3 interface, labeled P3, is added to the network device that is configured with a MTU size of 2100 bytes.

The MTU enforcement agent determines that the interface P3 has been added, and is configured with an egress L3 interface MTU size of 2100 bytes, which is different than the egress L3 interface MTU sizes configured for P1 and P2. Accordingly, the MTU enforcement agent updates the ingress MTU identifier table to obtain an updated ingress MTU identifier table (700 in FIG. 7), updates the packet propagation table to obtain an updated packet propagation table (800 in FIG. 8), and updates the MTU enforcement table to obtain an updated MTU enforcement table (900 in FIG. 9).

The MTU enforcement agent assigns an egress MTU identifier of 1 to P1, an egress MTU identifier of 2 to P3, and an egress MTU identifier of 3 to P2. The egress MTU identifiers are stored in an updated packet propagation table (800) that includes entries in which a network prefix is associated with egress L3 interface and an egress MTU identifier. The results of the assignment of egress MTU identifiers is shown in the packet propagation table (800) of FIG. 8. The updated packet propagation table (800) is programmed into a hardware table of a network chip.

Next, the MTU enforcement agent re-calculates ranges for the updated ingress MTU identifier table (700). Because the configured MTU sizes of the egress L3 interfaces are 1500, 2100, and 3000 bytes, the ranges are 0-1500, 1501-2100, and 2101-3000. Additionally, a fourth range is created for protocol packet payload lengths above the highest configured egress L3 interface MTU size. The third range is 3001-9214 because 9214 is the largest protocol packet payload length that might be received by the network device in this example. The range 0-1500 is assigned an ingress MTU identifier of 1. The range 1501-2100 is assigned a ingress MTU identifier of 2. The range 2101-3000 is assigned a ingress MTU identifier of 3. The range 3001-9214 is assigned a ingress MTU identifier of 4. The results of the calculation of ranges and assignment of ingress MTU identifiers is shown in the updated ingress MTU identifier table (700) shown in FIG. 7. The updated ingress MTU identifier table (700) is stored in a hardware table of an FPGA of the network device.

Next, an updated MTU enforcement table (900) is generated with an entry for each possible ingress/egress identifier pair. For each such pair, the MTU enforcement agent computes whether the pair is valid, meaning forwarding of a protocol packet should be allowed, or invalid, meaning an exception handler must be invoked. As discussed above, a valid pair is one that indicates that a received protocol packet has a payload length that is the same or smaller than the configured MTU size of an egress L3 interface identified during a packet propagation lookup.

In this example, an ingress MTU identifier of 1 indicates that the received protocol packet has a payload length within a range of 0-1500, and an egress MTU identifier of 1 indicates that the identified egress L3 interface has a configured MTU size of 1500 bytes. Thus the ingress/egress identifier pair of 1 and 1 is a valid pair, and the appropriate egress action is to allow forwarding of the protocol packet. Therefore, the first entry of the updated MTU enforcement table (900) includes the ingress MTU identifier 1, the egress MTU identifier 1, and the egress action 'Forward'.

In this example, an egress MTU identifier of 2 indicates that the identified egress L3 interface has a configured MTU size of 2100 bytes. Thus the ingress/egress identifier pair of 1 and 2 is a valid pair, and the appropriate egress action is to allow forwarding of the protocol packet. Therefore, the second entry of the updated MTU enforcement table (900) includes the ingress MTU identifier 1, the egress MTU identifier 2, and the egress action 'Forward'.

In this example, an egress MTU identifier of 3 indicates that the identified egress L3 interface has a configured MTU size of 3000 bytes. Thus the ingress/egress identifier pair of 1 and 3 is a valid pair, and the appropriate egress action is to allow forwarding of the protocol packet. Therefore, the third entry of the updated MTU enforcement table (900) includes the ingress MTU identifier 1, the egress MTU identifier 3, and the egress action 'Forward'.

In this example, an ingress MTU identifier of 2 indicates that the received protocol packet has a payload length within a range of 1501-2100, and an egress MTU identifier of 1 indicates that the identified egress L3 interface has a configured MTU size of 1500 bytes. Thus the ingress/egress identifier pair of 2 and 1 is an invalid pair, and the appropriate egress action is to invoke an exception handler. Therefore, the fourth entry of the updated MTU enforcement table (900) includes the ingress MTU identifier 2, the egress MTU identifier 1, and the egress action 'Exception'.

In this example, an egress MTU identifier of 2 indicates that the identified egress L3 interface has a configured MTU size of 2100 bytes. Thus the ingress/egress identifier pair of 2 and 2 is a valid pair, and the appropriate egress action is to allow forwarding of the protocol packet. Therefore, the fifth entry of the updated MTU enforcement table (900) includes the ingress MTU identifier 2, the egress MTU identifier 2, and the egress action 'Forward'.

In this example, an egress MTU identifier of 3 indicates that the identified egress L3 interface has a configured MTU size of 3000 bytes. Thus the ingress/egress identifier pair of 2 and 3 is a valid pair, and the appropriate egress action is to allow forwarding of the protocol packet. Therefore, the sixth entry of the updated MTU enforcement table (900) includes the ingress MTU identifier 2, the egress MTU identifier 3, and the egress action 'Forward'.

In this example, an ingress MTU identifier of 3 indicates that the received protocol packet has a payload length within a range of 2101-3000, and an egress MTU identifier of 1 indicates that the identified egress L3 interface has a configured MTU size of 1500 bytes. Thus the ingress/egress identifier pair of 3 and 1 is an invalid pair, and the appropriate egress action is to invoke an exception handler. Therefore, the seventh entry of the updated MTU enforcement table (900) includes the ingress MTU identifier 3, the egress MTU identifier 1, and the egress action 'Exception'.

In this example, an egress MTU identifier of 2 indicates that the identified egress L3 interface has a configured MTU size of 2100 bytes. Thus the ingress/egress identifier pair of 3 and 2 is an invalid pair, and the appropriate egress action is to invoke an exception handler. Therefore, the eighth entry of the updated MTU enforcement table (900) includes the ingress MTU identifier 3, the egress MTU identifier 2, and the egress action 'Exception'.

In this example, an egress MTU identifier of 3 indicates that the identified egress L3 interface has a configured MTU size of 3000 bytes. Thus the ingress/egress identifier pair of 3 and 3 is a valid pair, and the appropriate egress action is to allow forwarding of the protocol packet. Therefore, the ninth entry of the updated MTU enforcement table (900) includes the ingress MTU identifier 3, the egress MTU identifier 3, and the egress action 'Forward'.

In this example, an ingress MTU identifier of 4 indicates that the received protocol packet has a payload length within a range of 3001-9214, and an egress MTU identifier of 1 indicates that the identified egress L3 interface has a configured MTU size of 1500 bytes. Thus the ingress/egress identifier pair of 4 and 1 is an invalid pair, and the appropriate egress action is to invoke an exception handler. Therefore, the tenth entry of the updated MTU enforcement table (900) includes the ingress MTU identifier 4, the egress MTU identifier 1, and the egress action 'Exception'.

In this example, an egress MTU identifier of 2 indicates that the identified egress L3 interface has a configured MTU size of 2100 bytes. Thus the ingress/egress identifier pair of 4 and 2 is an invalid pair, and the appropriate egress action is to invoke an exception handler. Therefore, the eleventh entry of the updated MTU enforcement table (900) includes the ingress MTU identifier 4, the egress MTU identifier 2, and the egress action 'Exception'.

In this example, an egress MTU identifier of 3 indicates that the identified egress L3 interface has a configured MTU size of 3000 bytes. Thus the ingress/egress identifier pair of 4 and 3 is an invalid pair, and the appropriate egress action is to invoke an exception handler. Therefore, the eleventh entry of the updated MTU enforcement table (900) includes the ingress MTU identifier 4, the egress MTU identifier 3, and the egress action 'Exception'.

The updated MTU enforcement table (900) is stored in a hardware table of an FPGA of the network device.

Continuing the example, once the updated ingress MTU identifier table (700), the updated packet propagation table (800), and the updated MTU enforcement table (900) are programmed into their respective hardware tables, they may be used for the egress L3 MTU enforcement aspect of processing received protocol packets.

Once an Ethernet frame is received at a physical interface of the network device, and has been processed to obtain the IP packet therein, the MTU enforcement agent checks the total length field of the IP header to ascertain that the protocol packet payload length is 2700 bytes. The length is then used as a key to perform an ingress MTU identifier lookup in the updated ingress MTU identifier table (700), which yields an ingress MTU identifier of 3. Next, a packet propagation table lookup is performed using the updated packet propagation table (800) and the destination IP address found in the header of the IP packet, which is 10.30.8.45. Accordingly, the LPM identified is 10.30.0.0/16, which is associated with an egress L3 interface P2 that has an egress L3 interface MTU of 3000, which is associated with an egress MTU identifier of 3. Therefore, the ingress/egress identifier pair is 3 and 3. This pair is used to perform an MTU enforcement lookup in the updated MTU enforcement table (900), which yields an egress action of 'Forward'. Accordingly, the packet is further processed to forward the IP packet to an appropriate next-hop.

Next, another Ethernet frame is received at a physical interface of the network device, and has been processed to obtain the IP packet therein, the MTU enforcement agent checks the total length field of the IP header to ascertain that the protocol packet payload length is 1700 bytes. The length is then used as a key to perform an ingress MTU identifier lookup in the ingress updated MTU identifier table (700), which yields an ingress MTU identifier of 2. Next, a packet propagation table lookup is performed using the updated packet propagation table (800) and the destination IP address found in the header of the IP packet, which is 10.10.89.54. Accordingly, the LPM identified is 10.10.0.0/16, which is associated with an egress L3 interface P1 that has an egress L3 interface MTU of 1500, which is associated with an egress MTU identifier of 1. Therefore, the ingress/egress identifier pair is 2 and 1. This pair is used to perform an MTU enforcement lookup in the updated MTU enforcement table (900), which yields an egress action of 'Exception'. In this example, the packet is dropped, and an error message is returned to a source device identified by a source IP address of the IP packet. Alternatively, the packet could be fragmented to appropriate size portions and then the portions are forwarded.

While embodiments described herein have been described with respect to a limited number of embodiments, those skilled in the art, having benefit of this disclosure, will appreciate that other embodiments can be devised which do not depart from the scope of embodiments described herein as disclosed herein. Accordingly, the scope embodiments described herein should be limited only by the attached claims.

The invention claimed is:

1. A method for egress maximum transmission unit (MTU) enforcement, the method comprising:
   receiving a protocol packet at an ingress interface of a network device;

make a first determination of a protocol packet payload length;

performing an ingress MTU identifier lookup in an ingress MTU identifier table using the protocol packet payload length to obtain an ingress MTU identifier;

performing a packet propagation lookup to obtain an egress MTU identifier;

performing an MTU enforcement lookup in an MTU enforcement table using the ingress MTU identifier and the egress MTU identifier to obtain an egress action; and performing the egress action.

2. The method if claim 1, wherein the egress action comprises allowing forwarding of the protocol packet.

3. The method of claim 1, wherein the egress action comprises initiating an exception handler action.

4. The method of claim 3, wherein the exception handler action comprises fragmenting the protocol packet or to returning an error message to a source device.

5. The method of claim 1, further comprising:
making a second determination that a new MTU has been configured for a second egress interface; and
based on the second determination, adding an ingress MTU table entry to the ingress MTU identifier table that is based on the new MTU.

6. The method of claim 5, further comprising:
based on the second determination, performing a re-computation of valid ingress/egress identifier pairs; and
updating the MTU enforcement table based on the re-computation.

7. The method of claim 1, wherein an egress MTU associated with the egress MTU identifier is based at least in part on an underlying protocol MTU.

8. The method of claim 1, wherein the first determination comprises examining a field in a protocol header of the protocol packet.

9. The method of claim 1, wherein performing the packet propagation lookup to obtain the egress MTU identifier comprises:
performing a longest prefix match (LPM) lookup to obtain an egress interface; and
performing an egress MTU identifier lookup using the egress interface to obtain the egress MTU identifier.

10. The method of claim 9, wherein performing the packet propagation lookup to obtain the egress MTU identifier comprises:
performing an additional lookup to determine that forwarding the protocol packet requires adding additional protocol packet payload length,
wherein adding the additional protocol packet payload length changes the obtained egress MTU identifier to a different egress MTU identifier.

11. A non-transitory computer readable medium comprising instructions that, when executed by a processor, perform a method for egress maximum transmission unit (MTU) enforcement, the method comprising:
receiving a protocol packet at an ingress interface of a network device;
make a first determination of a protocol packet payload length;
performing an ingress MTU identifier lookup in an ingress MTU identifier table using the protocol packet payload length to obtain an ingress MTU identifier;
performing a packet propagation lookup to obtain an egress MTU identifier;
performing an MTU enforcement lookup in an MTU enforcement table using the ingress MTU identifier and the egress MTU identifier to obtain an egress action; and
performing the egress action.

12. The non-transitory computer readable medium of claim 11, wherein the egress action comprises allowing forwarding of the protocol packet.

13. The non-transitory computer readable medium of claim 11, wherein the egress action comprises initiating an exception handler action.

14. The non-transitory computer readable medium of claim 13, wherein the exception handler action is to fragment the protocol packet or to return an error message to a source device.

15. The non-transitory computer readable medium of claim 11, wherein the method further comprises:
making a second determination that a new MTU has been configured for a second egress interface; and
based on the second determination, adding an ingress MTU table entry to the ingress MTU identifier table that is based on the new MTU.

16. The non-transitory computer readable medium of claim 15, wherein the method further comprises:
based on the second determination, performing a re-computation of valid ingress/egress identifier pairs; and
updating the MTU enforcement table based on the re-computation.

17. The non-transitory computer readable medium of claim 11, wherein an egress MTU associated with the egress MTU identifier is based at least in part on an underlying protocol MTU.

18. The non-transitory computer readable medium of claim 11, wherein the first determination comprises examining a field in a protocol header of the protocol packet.

19. The non-transitory computer readable medium of claim 11, wherein performing the packet propagation lookup to obtain the egress MTU identifier comprises:
performing a longest prefix match (LPM) lookup to obtain an egress interface; and
performing an egress MTU identifier lookup using the egress interface to obtain the egress MTU identifier.

20. The non-transitory computer readable medium of claim 19, wherein performing the packet propagation lookup to obtain the egress MTU identifier comprises:
performing an additional lookup to determine that forwarding the protocol packet requires adding additional protocol packet payload length,
wherein adding the additional protocol packet payload length changes the obtained egress MTU identifier to a different egress MTU identifier.

* * * * *

UNITED STATES PATENT AND TRADEMARK OFFICE
CERTIFICATE OF CORRECTION

PATENT NO. : 10,798,014 B1
APPLICATION NO. : 16/377150
DATED : October 6, 2020
INVENTOR(S) : Prashanth Krishnamurthy, Simon Francis Capper and Tula Kraiser It is certified that error appears in the above-identified patent and that said Letters Patent is hereby corrected as shown below:

In the Claims

Column 17, Line 13, in Claim 2, the phrase "The method if claim 1" should read -- The method of claim 1 --.

Signed and Sealed this
Eighth Day of December, 2020

Andrei Iancu
*Director of the United States Patent and Trademark Office*